United States Patent
Guduru et al.

(10) Patent No.: US 11,791,976 B2
(45) Date of Patent: Oct. 17, 2023

(54) SYSTEMS AND METHODS FOR DYNAMIC TIME DIVISION DUPLEX ADJUSTMENT IN A WIRELESS NETWORK

(71) Applicant: Verizon Patent and Licensing Inc., Basking Ridge, NJ (US)

(72) Inventors: Vijayakrishna P. Guduru, Denville, NJ (US); Sudhakar Reddy Patil, Westlake, TX (US); Yuexin Dong, Bridgewater, NJ (US); David Taft, Keller, TX (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/681,909

(22) Filed: Feb. 28, 2022

(65) Prior Publication Data
US 2023/0275739 A1    Aug. 31, 2023

(51) Int. Cl.
*H04L 5/14* (2006.01)
*H04L 1/00* (2006.01)
*H04L 5/00* (2006.01)

(52) U.S. Cl.
CPC .......... *H04L 5/1469* (2013.01); *H04L 1/0026* (2013.01); *H04L 5/006* (2013.01); *H04L 5/1438* (2013.01)

(58) Field of Classification Search
None
See application file for complete search history.

(56) References Cited

U.S. PATENT DOCUMENTS

2014/0233439 A1*  8/2014  Hong ................. H04W 72/569
                                                           370/280
2021/0289391 A1*  9/2021  Paladugu ........... H04L 47/2491

FOREIGN PATENT DOCUMENTS

WO    WO-2014109411 A1 *  7/2014  ............... H04J 3/16

OTHER PUBLICATIONS

3GPP TS 23.501, "3rd Generation Partnership Project; Technical Specification Group Services and System Aspects; System architecture for the 5G System (5GS); Stage 2 (Release 17)" (Dec. 2021).

(Continued)

*Primary Examiner* — Hong Shao

(57) ABSTRACT

A system described herein may identify Quality of Service ("QoS") information associated with a User Equipment ("UE") that is connected to a radio access network ("RAN") of a wireless network. The QoS information may include or may be based on a network slice identifier, a QoS value, a Service Level Agreement ("SLA"), a model associated with UE attributes, or other suitable information. The system may determine a time division duplex ("TDD") configuration for the UE based on the identified QoS information and/or models that associate UE attributes to TDD configurations. The system may implement the determined TDD configuration at the RAN. The UE and the RAN may communicate with each other according to the implemented TDD configuration, which may include particular timing information for uplink and downlink communications between the UE and the RAN.

20 Claims, 11 Drawing Sheets

(56) References Cited

OTHER PUBLICATIONS

3GPP TS 23.502, "3rd Generation Partnership Project; Technical Specification Group Services and System Aspects; Procedures for the 5G System (5GS); Stage 2 (Release 17)" (Dec. 2021).
3GPP TS 23.503, "3rd Generation Partnership Project; Technical Specification Group Services and System Aspects; Policy and charging control framework for the 5G System (5GS); Stage 2 (Release 17)" (Dec. 2021).
3GPP TS 36.211, "3rd Generation Partnership Project; Technical Specification Group Radio Access Network; Evolved Universal Terrestrial Radio Access (E-UTRA); Physical channels and modulation (Release 16)" (Sep. 2021).
3GPP TS 38.331, "3rd Generation Partnership Project; Technical Specification Group Radio Access Network; NR; Radio Resource Control (RRC) protocol specification (Release 16)" (Dec. 2021).

\* cited by examiner

SYSTEMS AND METHODS FOR DYNAMIC TIME DIVISION DUPLEX ADJUSTMENT IN A WIRELESS NETWORK

BACKGROUND

Wireless networks, such as radio access networks ("RANs"), may use various techniques for allocating physical radio frequency ("RF") resources for communications to and from User Equipment ("UEs"), such as wireless phones, Internet of Things ("IoT") devices, fixed wireless access ("FWA") devices, or other types of devices. One such technique may include time division duplex ("TDD"), in which the same portion of RF spectrum is used for uplink transmissions during a first time period and for downlink transmissions during a second time period.

DETAILED DESCRIPTION OF EXAMPLE EMBODIMENTS

The following detailed description refers to the accompanying drawings. The same reference numbers in different drawings may identify the same or similar elements.

Embodiments described herein provide for the dynamic adjustment of TDD parameters in a wireless network. Such adjustment may, in some embodiments, include adjusting the duration, arrangement, or other attributes of uplink and/or downlink time windows associated with one or more wireless channels between a UE and a RAN. For example, such adjustment may include increasing a ratio of downlink resources to uplink resources (e.g., increasing an amount of time that a particular portion of RF spectrum is allocated to downlink communications relative to an amount of time that the particular portion of RF spectrum is allocated to uplink communications), or vice versa.

As discussed herein, the adjustments may be made based on varying criteria, such as a network slice associated with a communication session between a UE and a core network, attributes of the UE (e.g., device type, UE power class, etc.), location of the UE and/or the RAN, QoS thresholds or Service Level Agreements ("SLAs") associated with the UE, and/or other suitable criteria. In some embodiments, such criteria may be modeled using modeling techniques such as artificial intelligence/machine learning ("AI/ML") techniques or other suitable techniques, and may be predictively or proactively applied to communication channels between one or more UEs and one or more RANs.

Modifying TDD parameters associated with a particular UE may allow for fine tuning, adjusting, etc. of a communication channel between the UE and the RAN, in order to enhance utilization of RF resources of the RAN (e.g., increase the usage of allocated resources and decrease the amount of resources that are unallocated but not used to carry traffic). Further embodiments described herein may increase the performance of communications between the UE and the RAN by minimizing an amount of queueing delay. As such, the user experience of users of UEs may be improved, as the perceived performance of traffic associated with the UE may be improved. Further, the adjustment of TDD parameters for a UE may allow for the adjustment of a resource allocation associated with the UE without needing to modify the resource allocation associated with other UEs that are communicatively coupled to the same RAN, thus allowing for granular control of resource allocations on a per-UE or per-UE group basis.

Figure 1:
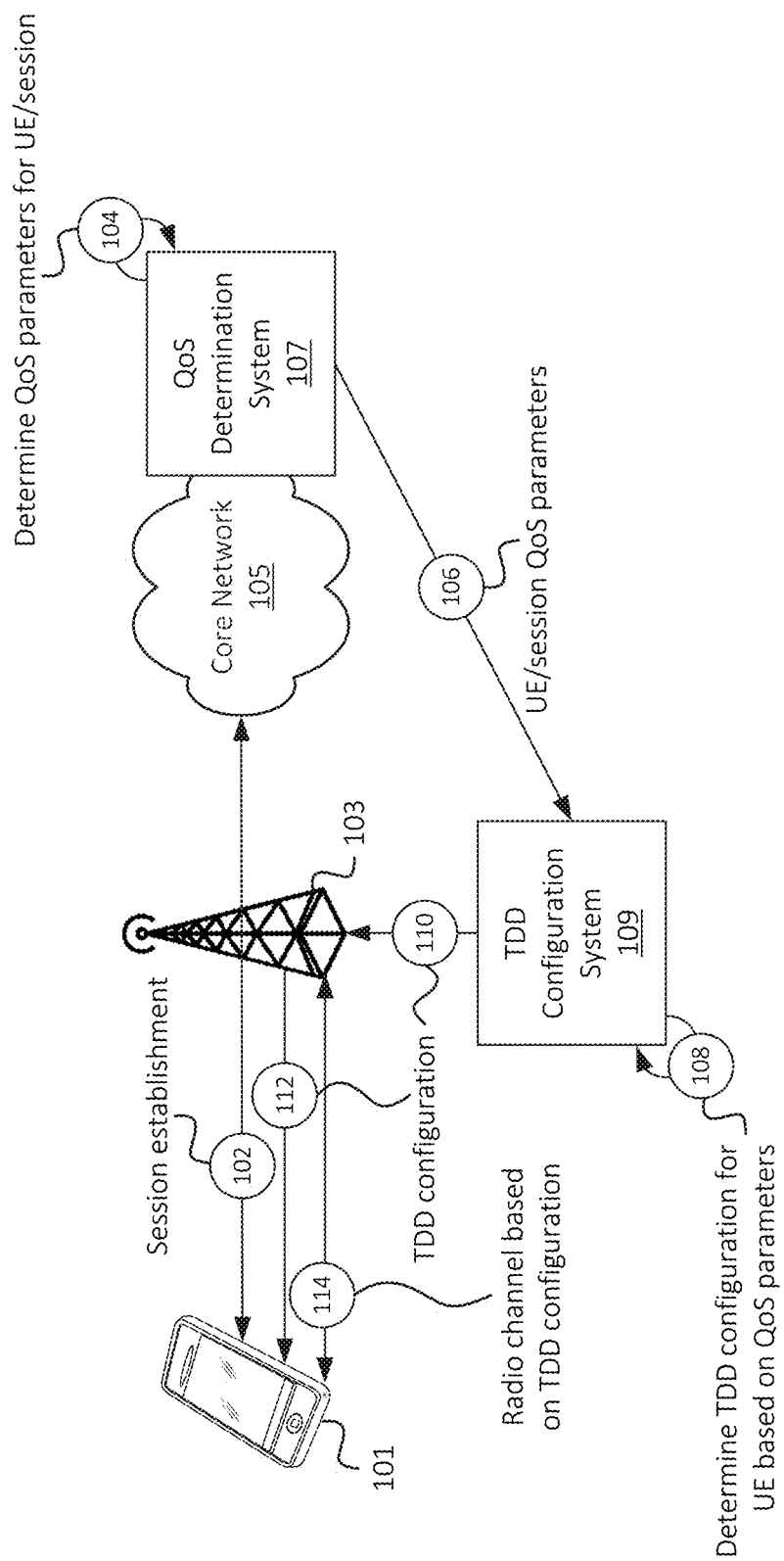
FIG. 1 illustrates an example overview of one or more embodiments described herein.

As shown in FIG. 1, UE 101 may be communicatively coupled to base station 103. For example, UE 101 and base station 103 may have performed the establishment of one or more RF channels, such as be performing a Radio Resource Control ("RRC") setup procedure or other suitable procedure. Base station 103 may be one out of a set of base stations associated with a RAN of a wireless network.

UE 101 may include a wireless phone, an IoT device, a Machine-to-Machine ("M2M") device, an FWA device, or other suitable type of device that communicates wirelessly with base station 103. Base station 103 may, for example, serve as a wireless interface between UE 101 and one or more networks, such as core network 105, which may provide routing services, call or session management services, traffic processing services, or other services to UE 101. Core network 105 may be associated with one or more network slices, where different slices provide differentiated levels of service, such as service in accordance with different QoS parameters.

UE 101 and core network 105 may accordingly be associated with one or more sessions (established at 102), such as a protocol data unit ("PDU") session, a user plane data session, an Internet Protocol ("IP") session, or other type of communication session. Such communication sessions may be used to carry voice traffic between UE 101 and core network 105, application traffic, data traffic, and/or other types of traffic. Core network 105 may, for example, route such traffic between UE 101 and one or more other networks or application servers. The communication session or sessions may be associated with one or more network slices, SLAs, QoS parameters, Access Point Names ("APNs"), or the like, which may indicate particular performance metrics, thresholds, goals, etc. (e.g., minimum acceptable throughput, maximum acceptable latency, etc.) for the one or more sessions.

In accordance with some embodiments, QoS Determination System ("QDS") 107 may identify the establishment (at 102) of one or more communication sessions between UE 101 and core network 105. In some embodiments, QDS 107 may be, may be implemented by, and/or may be communicatively coupled to one or more elements of core network 105, such as a Session Management Function ("SMF"), a User Plane Function ("UPF"), a Policy Control Function ("PCF"), or the like. Additionally, or alternatively, QDS 107 may be external to core network 105, and may receive an indication of the session establishment (at 102) from a Network Exposure Function ("NEF"), a Service Capability Exposure Function ("SCEF"), or other interface associated with core network 105. In some embodiments, the information regarding the one or more communication sessions may include an indication of QoS thresholds, SLAs, network slices, etc. with which the one or more communication sessions are associated. Such indications may include an index or reference to a mapping of QoS thresholds, SLAs, etc. In some embodiments, such index or reference may include a Network Slice Selection Assistance Information ("NSSAI") value, a Fifth Generation ("5G") QoS identifier ("5QI") value, or other suitable value.

In some embodiments, QDS 107 may receive information regarding UE 101 from a Unified Data Management function ("UDM"), a Home Subscriber Server ("HSS"), or some other device or system that maintains information regarding UE 101. Such UE information may include a device type of UE 101 (e.g., mobile telephone, IoT device, M2M device, etc.), attributes of UE 101 (e.g., UE power class, battery level, processor speed, etc.), slice authorization information (e.g., an indication of network slices that UE 101 is authorized to access), SLA information (e.g., indicating one or more SLAs, QoS thresholds, etc.), or other suitable UE information.

QDS 107 may determine (at 104) QoS parameters for UE 101 and/or for the one or more sessions associated with UE 101 and core network 105. For example, QDS 107 may determine such QoS parameters based on information regarding the communication session and/or UE 101, as discussed above. The QoS parameters may include and/or may be based on performance thresholds, traffic or application type (e.g., voice traffic, content streaming traffic, etc.), or other suitable parameters. In some embodiments, as described further below, QDS 107 may maintain one or more models, mappings, etc. based on which a particular set of QoS parameters may be determined (at 104) based on UE information, network slice information, session information, or other suitable information.

QDS 107 may provide (at 106) the determined QoS parameters for the session and/or for UE 101 to TDD Configuration System ("TCS") 109. TCS 109 may be communicatively coupled to base station 103. For example, the same set of hardware may implement some or all of base station 103 and/or TCS 109. Additionally, or alternatively, TCS 109 may implemented by a Multi-Access/Mobile Edge Computing ("MEC") device, referred to sometimes herein simply as a "MEC," that is communicatively coupled to or otherwise associated with base station 103. In some embodiments, QDS 107 and TCS 109 may communicate via core network 105 and/or some other network, application programming interface ("API"), or other suitable communication pathway.

Figure 2:
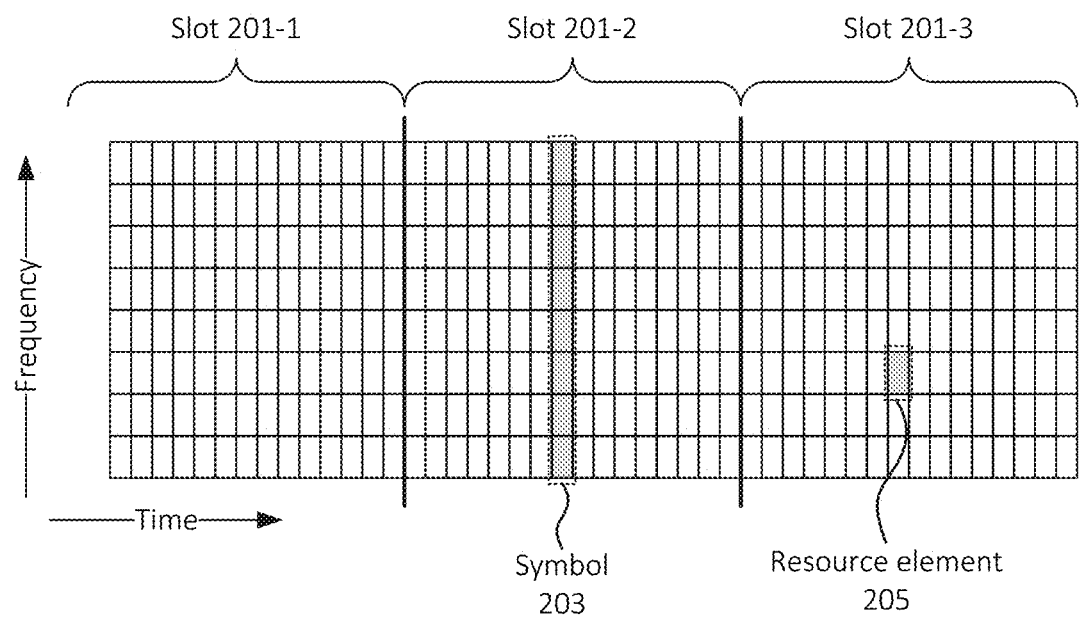
FIG. 2 illustrates an example arrangement of physical resources associated with a RAN in the time and frequency domains.
Figure 3:
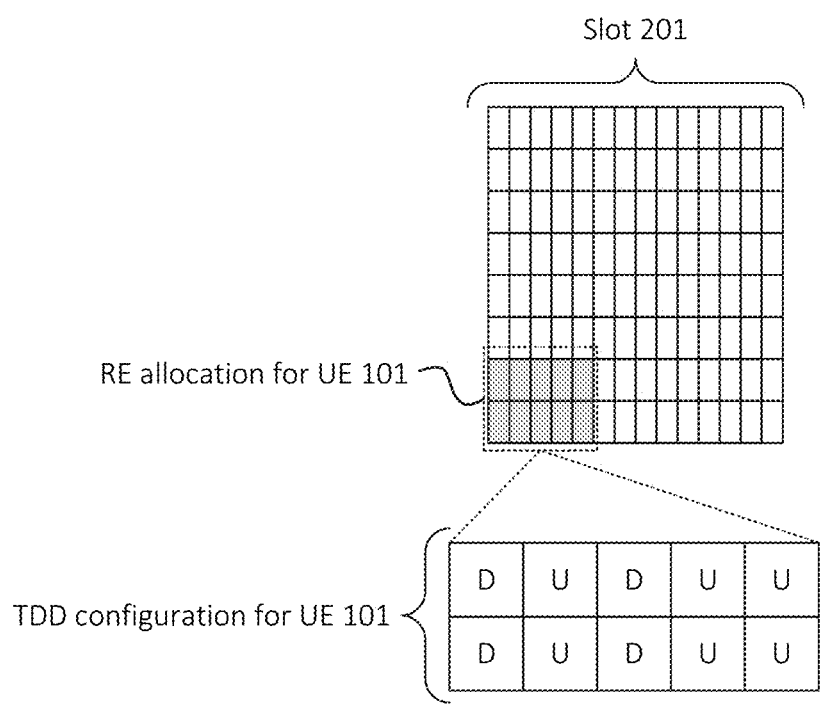
FIG. 3 illustrates an example TDD configuration associated with a given UE.

In some embodiments, TCS 109 may receive or maintain a TDD configuration associated with base station 103. For example, base station 103 may determine or maintain information indicating a resource allocation associated with base station 103, which may include one or more TDD configurations. FIGS. 2 and 3 illustrate example resource allocations and/or TDD configurations. As shown in FIG. 2, RF resources of base station 103 may be allocated on a time and frequency domain. For example, time slots 201 may repeat cyclically, and may each include a set of symbols 203, which may be orthogonal frequency-division multiplexing ("OFDM") symbols. In some embodiments, time slots 201 may each be 10-millisecond time periods or time periods of some other duration. A particular symbol 203 may refer to a particular portion of a particular slot 201. In this example, three example slots 201-1, 201-2, and 201-3 may each be associated with the same quantity of symbols 203 (e.g., 14 symbols 203). A particular portion of the RF spectrum (e.g., band, sub-band, carrier, sub-carrier, frequency range, etc.) may be able to be allocated at each symbol. A particular portion of the RF spectrum, at a particular symbol 203, may be referred to as a Resource Element ("RE") 205. In an example where base station 103 sends and/or receives RF signals within 8 portions of the RF spectrum (e.g., carriers, sub-carriers, etc.), a particular slot 201 that includes 12 symbols 203 may include 96 REs 205 that may be allocated to one or more UEs 101 that are connected to base station 103. In some embodiments, base station 103 may operate additional or fewer portions of the RF spectrum, and/or may implement slots 201 to include additional or fewer symbols 203.

One or more UEs 101 may thus be allocated a portion of the RF resources available with respect to a given base station 103, which may include a particular set of REs 205 available during one or more slots 201. As shown in FIG. 3, for example, the allocation for a particular UE 101 may include 10 REs. In some embodiments, a TDD configuration for UE 101 may be used to indicate which REs are dedicated to uplink signals (e.g., RF signals sent from UE 101 to base station 103) and which REs are dedicated to downlink signals (e.g., RF signals sent from base station 103 to UE 101).

REs 205 dedicated to uplink signals are denoted with a "U" in the figure, while REs 205 dedicated to downlink signals are denoted with a "D" in the figure. Base station 103 may receive or "listen" for signals from UE 101 on uplink REs, while UE 101 may receive or "listen" for signals from base station 103 from base station 103 on downlink REs. In some embodiments, the REs of a particular symbol 203 (e.g., portion of slot 201 on the time domain) may be required to have the same TDD dedication (e.g., all REs 205 on the particular symbol 203 may be required to be uplink or downlink REs). In some embodiments, REs 205 on the same symbol 203 may be able to be a mix of uplink and downlink REs. In some embodiments, one or more REs 205 may be denoted as "guard" REs, "reserved" REs, and/or may be denoted in some manner other than "uplink" or "downlink." Concepts described herein, with respect to uplink or downlink REs, may be used in conjunction with embodiments in which REs may be denoted in some other manner.

In this example, UE 101 may be associated with a 30/70 split of downlink and uplink REs 205. As shown, for instance, the TDD configuration for UE 101 may include, on slot 201, 3 downlink REs 205 and 7 uplink REs 205. In accordance with embodiments described herein, the TDD configuration for UE 101 may be dynamically modified, without changing the RE allocation for UE 101. For example, as discussed herein, the TDD configuration may be modified to a 50/50 split of downlink and uplink REs 205, a 70/30 split, and/or some other split. Such modification may, in some embodiments, be made without modifying the quantity of REs 205 allocated to UE 101 (or other UEs) within slot 201.

Figure 4:
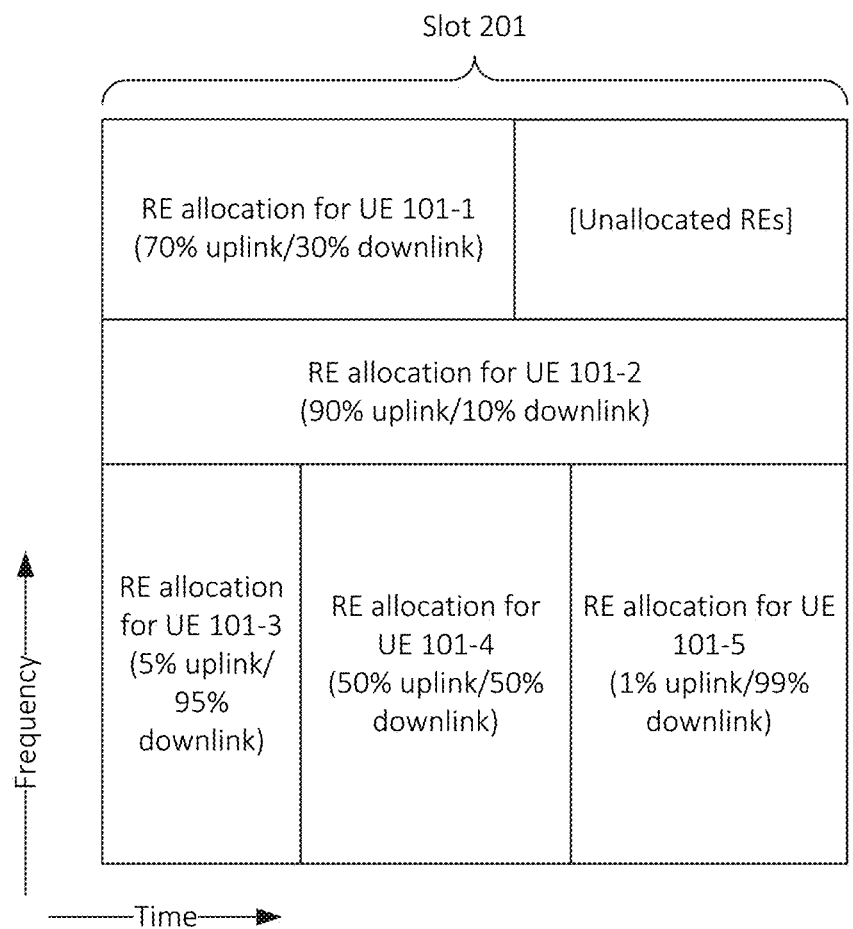
FIG. 4 illustrates examples of different TDD configurations associated with different UEs, in accordance with some embodiments.

As such, different UEs 101 that are connected to base station 103 may be associated with different respective resource allocations and different TDD configurations. As shown in FIG. 4, for example, resources of a given base station 103 within a given slot 201 may be allocated to UEs 101-1 through 101-5. UE 101-1 may, for example, be associated with a first RE allocation and a first TDD configuration, UE 101-2 may be associated with a second RE allocation and a second TDD configuration, UE 101-3 may be associated with a third RE allocation and a third TDD configuration, and so on. In some situations, a portion of the resources of base station 103 may be unallocated.

Figure 5:
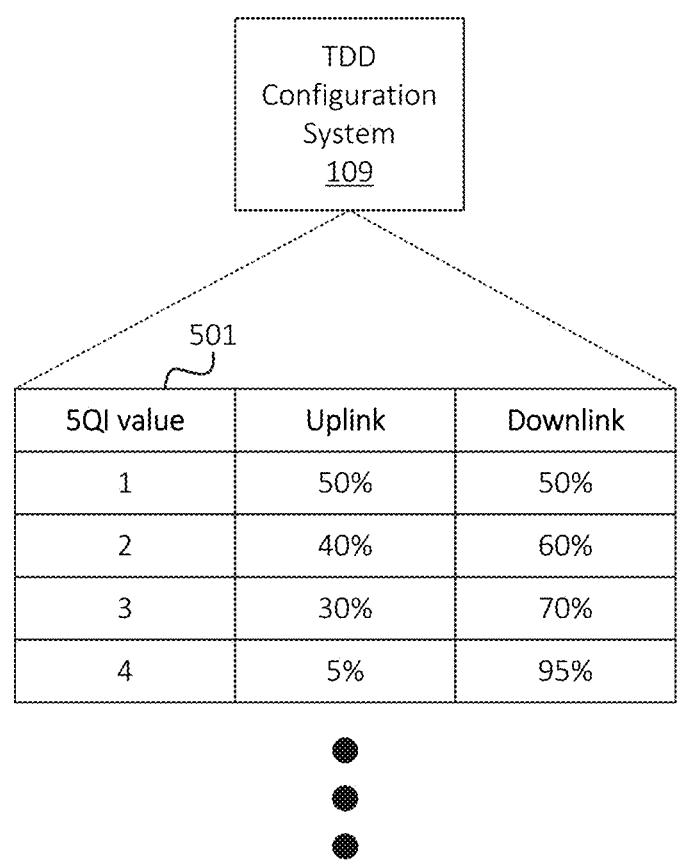
FIG. 5 illustrates an example mapping between Quality of Service ("QoS") identifiers and TDD configurations, in accordance with some embodiments.

Returning to FIG. 1, TCS 109 may determine (at 108) a TDD configuration for UE 101 based on the QoS parameters received (at 106) from QDS 107. For example, TCS 109 may determine the TDD configuration based on UE attributes, session parameters, network slice, etc., discussed above. As one example, TCS 109 may determine the TDD configuration based on a mapping between session QoS parameters and TDD configurations. As shown in FIG. 5, for example, TCS 109 may maintain data structure 501, which may include a mapping between 5QI values and TDD configurations. Data structure 501 may indicate, for example, that if a communication session between UE 101 is associated with a 5QI value of 1, the TDD configuration for UE 101 should be allocated as a 50/50 split between uplink and downlink REs. Data structure 501 may further indicate that if a communication session between UE 101 is associated with a 5QI value of 2, the TDD configuration for UE 101 should be allocated as a 40/60 split between uplink and downlink REs, that if a communication session between UE 101 is associated with a 5QI value of 3, the TDD configuration for UE 101 should be allocated as a 30/70 split between uplink and downlink REs, that if a communication session between UE 101 is associated with a 5QI value of 4, the TDD configuration for UE 101 should be allocated as a 5/95 split between uplink and downlink REs, and so on.

Figure 6:
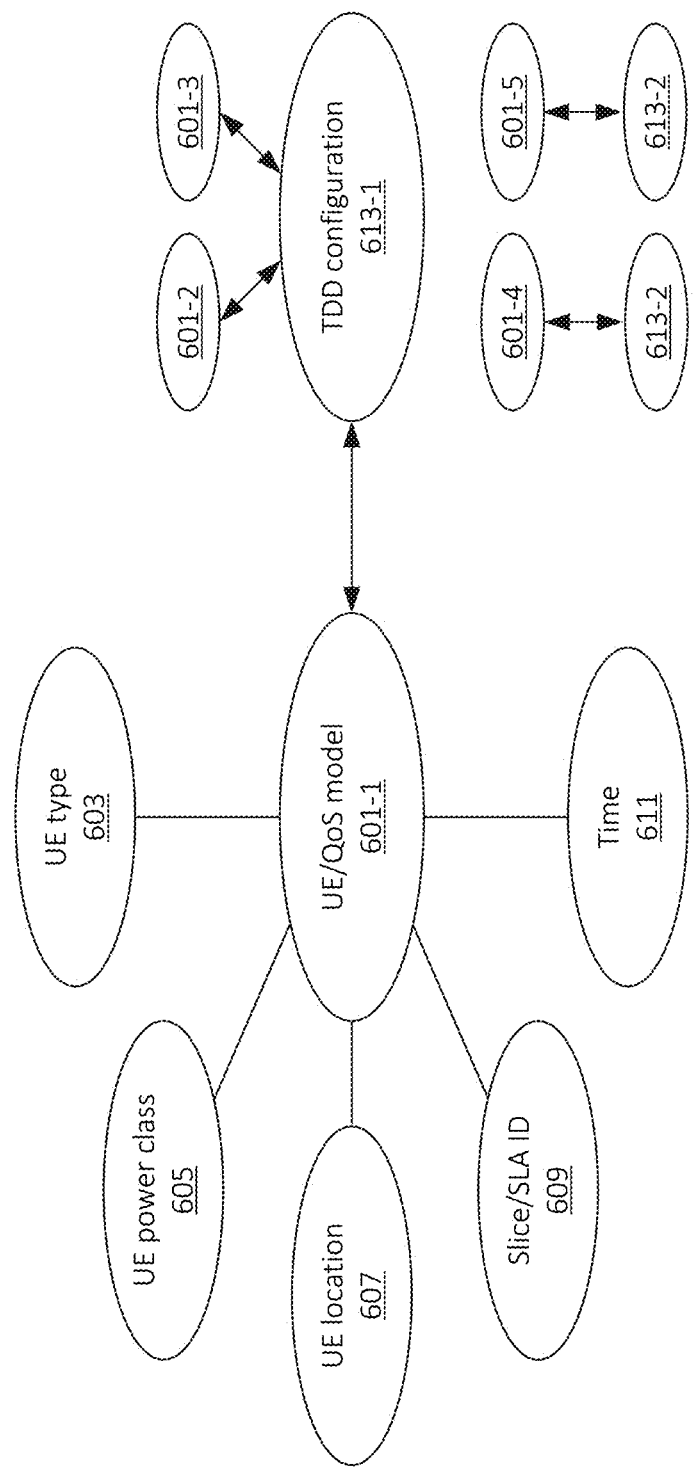
FIG. 6 illustrates an example association between UE models and TDD configurations, in accordance with some embodiments.

Additionally, or alternatively, as shown in FIG. 6, TCS 109 may generate, maintain, and/or refine one or more UE and/or QoS models 601 (referred to herein simply as "models 601" for the sake of brevity) that are associated with one or more TDD configurations 613. For example, as shown in FIG. 6, models 601-1, 601-2, and 60-3 may be associated with a first TDD configuration 613-1, model 601-4 may be associated with a second TDD configuration 613-2, and model 601-5 may be associated with a third TDD configuration 613-3. TDD configurations 613 may indicate a ratio, split, etc. of uplink and downlink RE allocations. Additionally, or alternatively, TDD configurations 613 may specify a minimum quantity of uplink and/or downlink REs in a given slot, a maximum quantity of uplink and/or downlink REs in a given slot, a particular sequence or pattern of uplink and/or downlink REs, and/or some other type of TDD configuration parameters.

As further shown, models 601 may be associated with parameters and/or attributes, such as UE type 603, UE power class 605, UE location 607, slice (or other type of SLA or QoS level) identifier 609, time 611, and/or other types of parameters or attributes. As noted above, the parameters and/or attributes may be received by TCS 109 from one or more elements of network 105, such as an SMF, a PCF, a UDM, and/or some other suitable source.

UE type 603 may include, for example, an indication of a type of a particular UE 101, such as a mobile telephone, an IoT device, an M2M device, etc. In some embodiments, the type of UE 101 may include a make or model of UE 101 and/or physical attributes or capabilities of UE 101, such as a screen size, processor speed, etc. UE power class 605 may indicate an amount of power associated with wireless transmissions associated with one or more wireless radios of UE 101 and/or may otherwise be based on the capability of UE 101 to send and/or receive wireless signals to and/or from base station 103.

UE location 607 may include a geographical location of UE 101 as determined by UE 101 (e.g., using Global Positioning System ("GPS") techniques or other suitable techniques) and/or by one or more base stations 103 utilizing a wireless triangulation technique or other suitable technique. UE location 607 may include latitude and longitude coordinates, GPS coordinates, an address, a name of a city or other type of region, and/or other type of indication of a geographical location of UE 101.

Slice, SLA, QoS, etc. identifiers 609 may include one or more identifiers of one or more network slices, SLAs, QoS levels, etc. associated with UE 101. For example, such identifiers 609 may include a list of network slices that UE 101 is authorized to access. Additionally, or alternatively, identifiers 609 may include an identifier (e.g., a NSSAI value or other identifier) of a particular network slice that is actively being used for one or more communication sessions between UE 101 and core network 105. In some embodiments, identifiers 609 may include a 5QI value associated with one or more communication sessions (e.g., one or more PDU sessions) between UE 101 and core network 105. In some embodiments, identifiers 609 may include an APN associated with one or more communication sessions between UE 101 and core network 105.

Thus, identifiers 609 may include identifiers or other indications of network slices, SLAs, QoS levels, etc. that are associated with UE 101. For example, in situations where UE 101 is engaged in multiple sessions with 105, where each session is associated with a different network slice, SLA, etc., identifiers 609 may include identifiers of each different network slice, SLA, etc. In this manner, the same UE 101 may be associated with different TDD configurations 613 when engaging in different combinations of types of communication sessions with core network 105. For example, when engaging in a voice call, UE 101 may be associated with a first model 601-1 (and therefore with TDD configuration 613-1), while the same UE 101 may be associated with another model 601-4 (and therefore with TDD configuration 613-2) when engaging in a voice call and a file transfer.

Time 611 may refer to time of day, day of week, and/or other temporal characteristics. For example, during working hours (e.g., 9 AM-5 PM), UE 101 may be associated with the first model 601-1 (and therefore with TDD configuration 613-1), while the same UE 101 may be associated with the other model 601-4 (and therefore with TDD configuration 613-2) during non-working hours (e.g., 5 PM-9 AM).

In some embodiments, TCS 109 may refine models 601, TDD configurations 613, and/or respective correlations or associations between models 601 and TDD configurations 613 using AI/ML techniques or other suitable techniques. For example, TCS 109 may iteratively refine models 601, TDD configurations 613, and/or the correlations/associations between models 601 and TDD configurations 613 in order to determine an optimal TDD configuration 613 when given a UE 101 having particular attributes, or located in a particular location and/or at a particular time.

In some embodiments, model 601 may include additional and/or different information. For example, in some embodiments, model 601 may include identifiers of groups, categories, etc. of UEs 101. For example, a particular group of UEs 101 may include UEs 101 belonging to a particular organization or institution, may be associated with a particular access class (e.g., "first responders" or "fleet vehicles"), etc. In this manner, different models 601 may be applied to different groups, categories, etc. of UEs 101.

Returning to FIG. 1, TCS 109 may provide (at 110) the determined TDD configuration for UE 101 to base station 103. Base station 103 may provide (at 112) the TDD configuration to UE 101. For example, base station 103 may provide the TDD configuration to UE 101 as an RRC message (e.g., RRC Reconfiguration Request message), as a System Information Block ("SIB"), and/or in some other suitable manner. As noted above, the TDD configuration may include timing information, such as times within slots 201 that UE 101 is able to output uplink traffic to base station 103 and/or receive downlink traffic from base station 103.

Base station 103 and UE 101 may accordingly communicate (at 114) with each other according to the TDD configuration provided (at 110) by TCS 109. For example, UE 101 may output uplink traffic to base station 103 on REs dedicated to uplink traffic from UE 101, and UE 101 may receive downlink traffic from base station 103 on REs dedicated to downlink traffic to UE 101.

Figure 7:
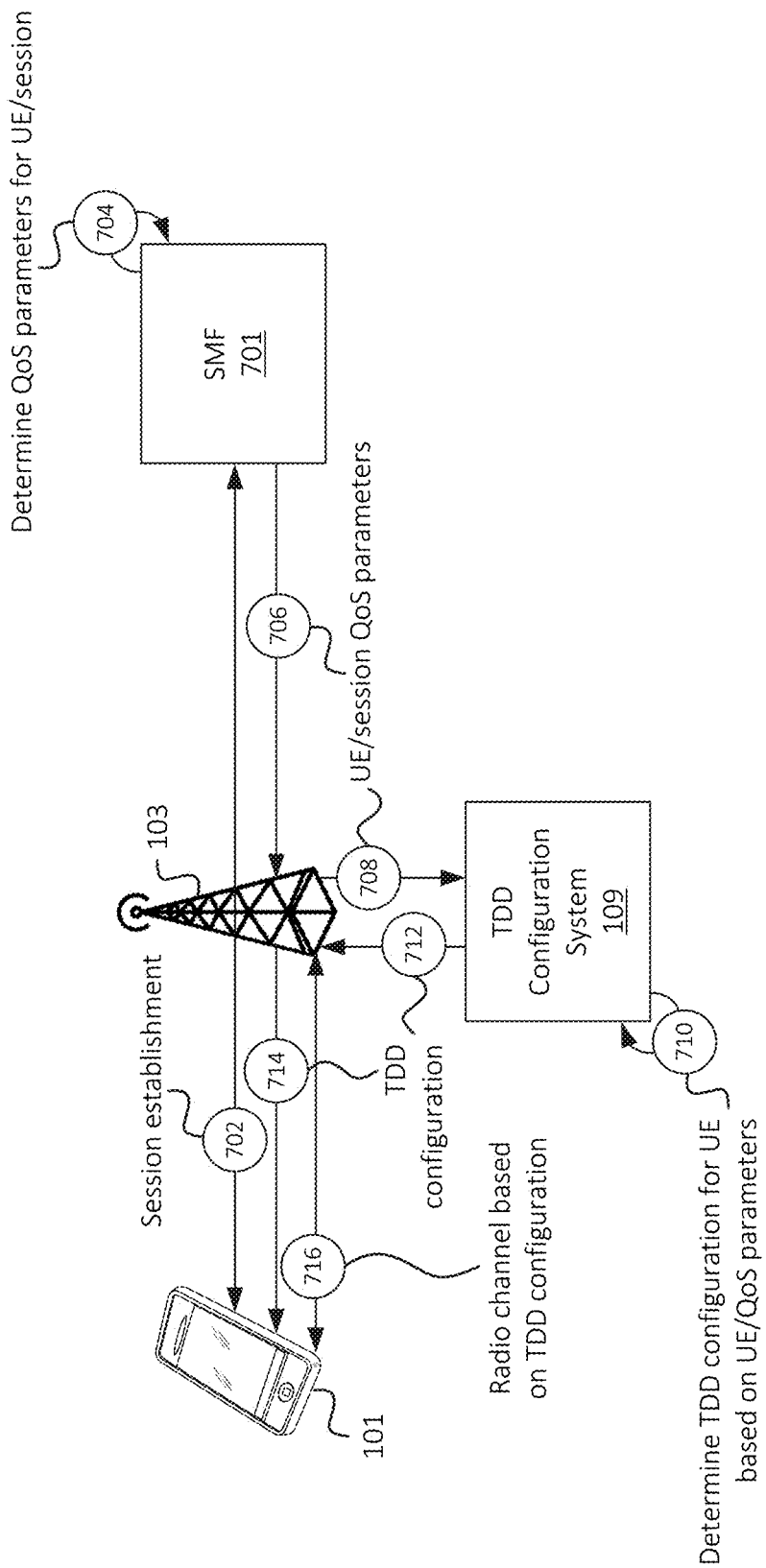
FIG. 7 illustrates an example of implementing a TDD configuration based on session QoS parameters provided by a core network, in accordance with some embodiments.

FIG. 7 illustrates an example of determining or adjusting TDD configuration parameters based on information provided by one or more elements of core network 105, such as SMF 701. In some embodiments, UE 101 and/or base station 103 may communicate with SMF 701 via one or more other network elements, such as an AMF. UE 101 and SMF 701 (e.g., via an AMF or other suitable network element) may participate (at 702) in a session establishment procedure, such as a PDU session establishment procedure. The PDU session may include, for example, a user plane data session between UE 101 and one or more elements of the network, such as a UPF.

As part of such procedure, or otherwise based on the session establishment, SMF 701 may determine (at 704) QoS parameters for the communication session associated with UE 101 (e.g., between UE 101 and the UPF). SMF 701 may, for example, receive UE information from a UDM, may receive policy information from a PCF, and/or may receive other suitable information based on which SMF 701 may determine the QoS parameters associated with the session. In some embodiments, such parameters include a slice identifier, a 5QI, an APN, or other suitable QoS parameters or identifiers.

SMF 701 may provide (at 706) the QoS parameters associated with the session to base station 103. For example, in some embodiments, SMF 701 may provide information associated with the session (e.g., endpoint identifiers, session identifier, etc.), which may include the QoS parameters, to an AMF via an N11 interface. The AMF may output such information to base station 103 via an N2 interface.

As similarly discussed above, TCS 109 may determine (at 710) a TDD configuration for UE 101 based on the QoS parameters provided (at 706) by SMF 701, which may include a 5QI value, a slice identifier, and/or some other suitable value or identifier. TCS 109 may provide (at 712) the TDD configuration to base station 103, which may forward (at 714) the TDD configuration to UE 101. UE 101 and base station 103 may proceed to communicate (at 716) with each other according to the TDD configuration, which may include sending and receiving traffic at times corresponding to the TDD configuration.

Figure 8:
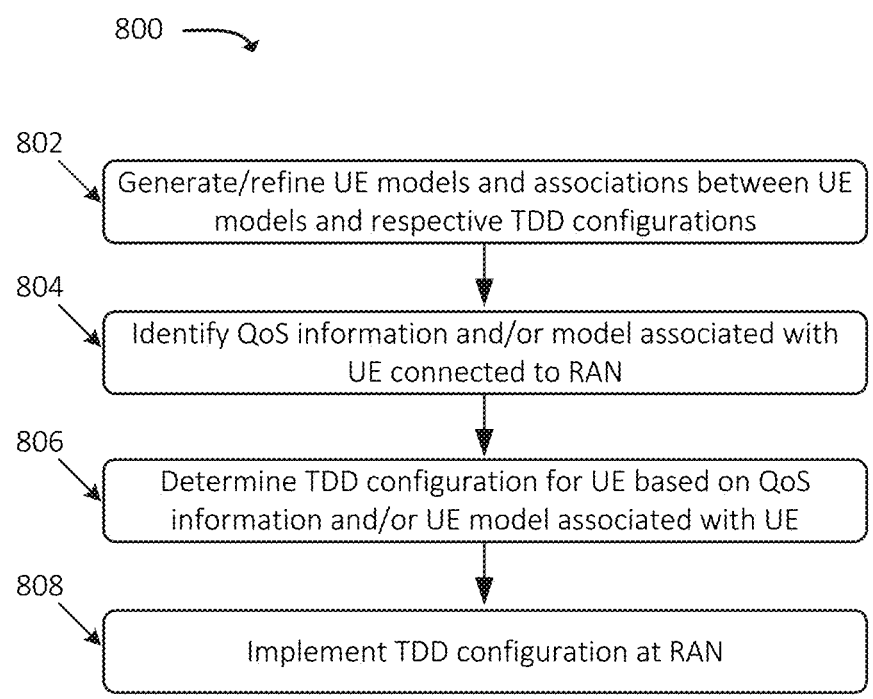
FIG. 8 illustrates an example process for implementing a TDD configuration for a particular UE based on attributes of the UE and/or QoS information associated with the UE, in accordance with some embodiments.

FIG. 8 illustrates an example process 800 for implementing a TDD configuration for a particular UE 101 based on attributes of UE 101 and/or QoS information associated with UE 101. In some embodiments, some or all of process 800 may be performed by TCS 109. In some embodiments, one or more other devices may perform some or all of process 800 in concert with TCS 109, such as QDS 107.

As shown, process 800 may include generating and/or refining (at 802) one or more UE models and associations between UE models and respective TDD configurations. For example, as discussed above with respect to FIG. 6, TCS 109 may generate and/or refine models 601 and/or TDD configurations 613 over time using modeling techniques such as AI/ML techniques or other suitable techniques, in order to optimize performance, network efficiency, and/or other suitable metrics, objectives, and/or measures of yield. As such, given a set of input parameters (e.g., UE type, UE power class, UE location, network slice associated with a given UE 101 and/or a communication session associated with UE 101, etc.), a particular TDD configuration 613 may be identified as optimal or otherwise associated with such set of input parameters.

Process 800 may further include identifying (at 804) QoS information and/or a particular model 601 associated with a particular UE 101 connected to a RAN (e.g., a particular base station 103 of the RAN). For example, TCS 109 may receive information indicating a network slice associated with UE 101 and/or a communication session between UE 101 and core network 105, a QoS identifier (e.g., a 5QI value or some other QoS identifier) associated with UE 101 and/or a communication session between UE 101 and core network 105, and/or other suitable QoS information. Additionally, or alternatively, TCS 109 may identify a particular model 601 associated with UE 101 and/or the communication session, based on attributes of UE 101 and/or the communication session (e.g., UE type 603, UE power class 605, UE location 607, network slice and/or SLA identifier 609, current time 611, etc.).

Process 800 may additionally include determining (at 806) a TDD configuration for UE 101 based on the QoS information and/or model 601. For example, as discussed above with respect to FIG. 5, TCS 109 may identify a mapping between QoS identifiers and TDD configurations. Additionally, or alternatively, TCS 109 may identify an association between a particular model 601 (e.g., with which UE 101 is associated) and a particular TDD configuration 613.

Process 800 may also include implementing (at 808) the TDD configuration at the RAN. For example, TCS 109 may provide information indicating the determined (at 806) TDD configuration to base station 103, which may communicate with UE 101 according to the TDD configuration (e.g., may utilize particular times, symbols, and/or REs for uplink or downlink communications, as indicated in the TDD configuration) between UE 101 and base station 103. Base station 103 may provide the TDD configuration to UE 101, such that UE 101 and base station 103 are synchronized with respect to the TDD configuration. In some embodiments, base station 103 may further modify the received TDD configuration before implementing the TDD configuration (e.g., the TDD configuration may be used by base station 103 as a factor in ultimately determining a TDD configuration to implement with respect to UE 101).

Figure 9:
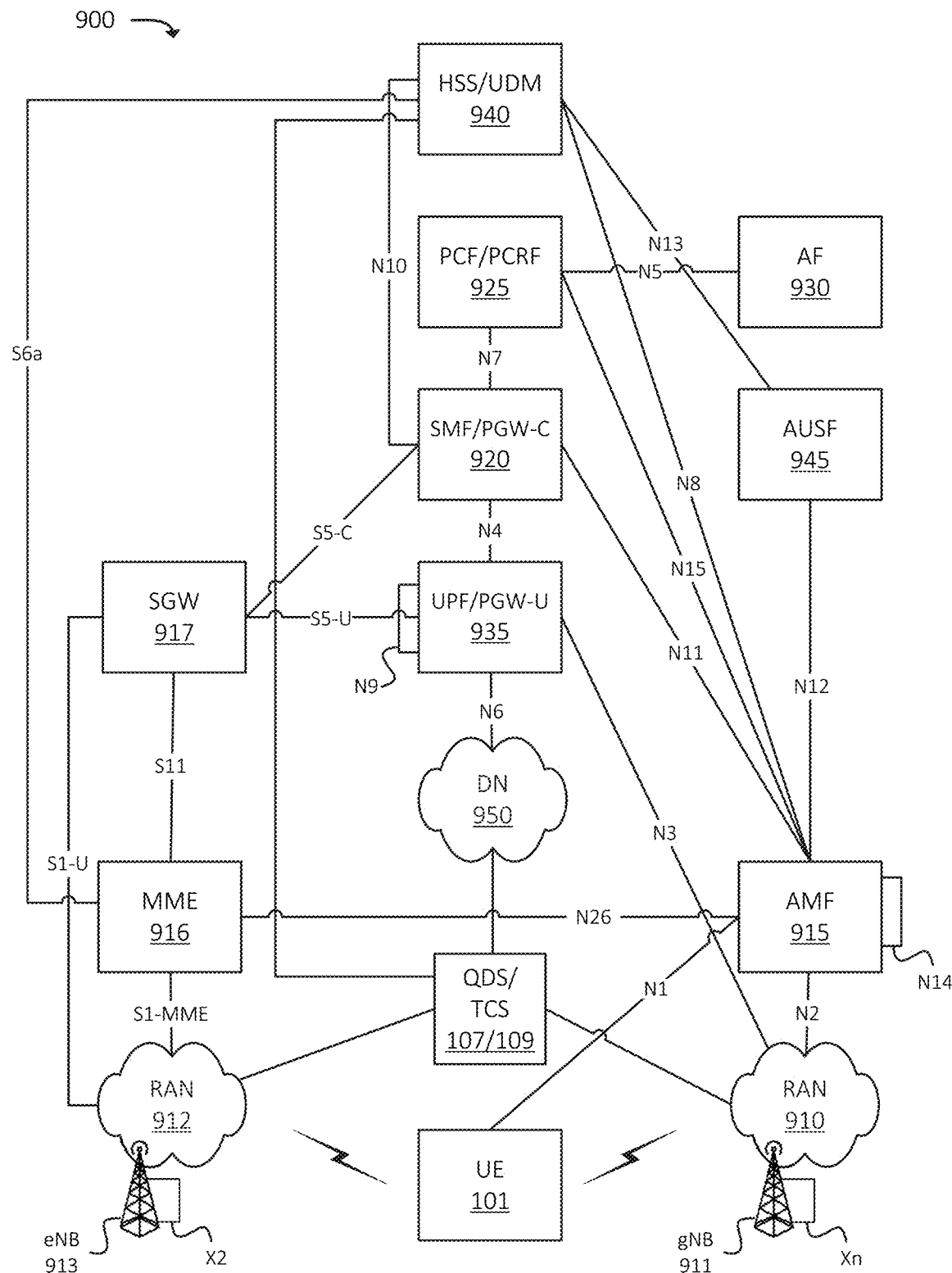
FIG. 9 illustrates an example environment in which one or more embodiments, described herein, may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 101, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as QDS 107 and/or TCS 109.

The example shown in FIG. 9 illustrates one instance of each network component or function (e.g., one instance of SMF/PGW-C 920, PCF/PCRF 925, UPF/PGW-U 935, HSS/UDM 940, and/or AUSF 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or AUSF 945, while another slice may include a second instance of SMF/PGW-C 920, PCF/PCRF 925, UPF/PGW-U 935, HSS/UDM 940, and/or AUSF 945). The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 101 may include a computation and communication device, such as a wireless mobile communication device that is capable of communicating with RAN 910, RAN 912, and/or DN 950. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), or another type of mobile computation and communication device. UE 101 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 101 may communicate with one or more other elements of environment 900. UE 101 may communicate with RAN 910 via an air interface (e.g., as provided by gNB 911). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, AMF 915, and/or one or more other devices or networks) and may communicate the traffic to UE 101 via the air interface. In some embodiments, base station 103 may be, may include, and/or may be implemented by one or more gNBs 911.

RAN 912 may be, or may include, a LTE RAN that includes one or more base stations (e.g., one or more eNBs 913), via which UE 101 may communicate with one or more other elements of environment 900. UE 101 may communicate with RAN 912 via an air interface (e.g., as provided by eNB 913). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, SGW 917, and/or one or more other devices or networks) and may communicate the traffic to UE 101 via the air interface. In some embodiments, base station 103 may be, may include, and/or may be implemented by one or more eNBs 913.

AMF 915 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 101. In some embodiments, the establishment of communications sessions may be performed in accordance with one or more policies provided by PCF/PCRF 925. In some embodiments, SMF/PGW-C 920 may include, may implement, may be communicatively coupled to, and/or may otherwise be associated with SMF 701.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 101, from DN 950, and may forward the user plane data toward UE 101 (e.g., via RAN 910, SMF/PGW-C 920, and/or one or more other devices). In some embodiments, multiple UPFs 935 may be deployed (e.g., in different geographical locations), and the delivery of content to UE 101 may be coordinated via the N9 interface (e.g., as denoted in FIG. 9 by the line marked "N9" originating and terminating at UPF/PGW-U 935). Similarly, UPF/PGW-U 935 may receive traffic from UE 101 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, CNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 101.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 101 may communicate, through DN 950, with data servers, other UEs 101, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 101 may communicate.

Figure 10:
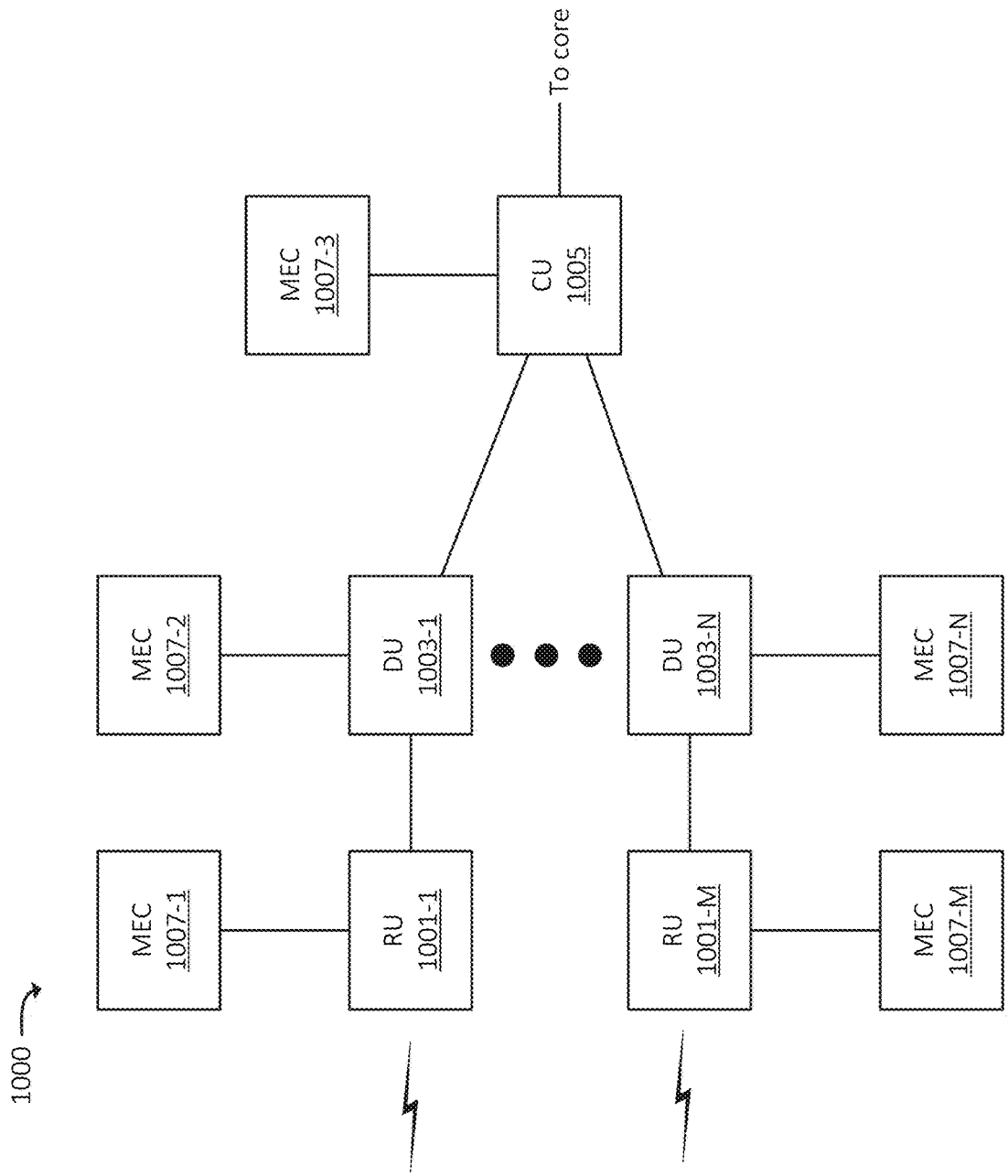
FIG. 10 illustrates an example arrangement of a RAN, in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 101 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 101, and may determine which DU(s) 1003 should receive the downlink traffic. DU 1003 may include one or more devices that transmit traffic between a core network (e.g., via CU 1005) and UE 101 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 101.

RU 1001 may include hardware circuitry (e.g., one or more RF transceivers, antennas, radios, and/or other suitable hardware) to communicate wirelessly (e.g., via an RF interface) with one or more UEs 101, one or more other DUs 1003 (e.g., via RUs 1001 associated with DUs 1003), and/or any other suitable type of device. In the uplink direction, RU 1001 may receive traffic from UE 101 and/or another DU 1003 via the RF interface and may provide the traffic to DU 1003. In the downlink direction, RU 1001 may receive traffic from DU 1003, and may provide the traffic to UE 101 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 101, via a respective RU 1001.

For example, RU 1001-1 may route some traffic, from UE 101, to MEC 1007-1 instead of to a core network (e.g., via DU 1003 and CU 1005). MEC 1007-1 may process the traffic, perform one or more computations based on the received traffic, and may provide traffic to UE 101 via RU 1001-1. In this manner, ultra-low latency services may be provided to UE 101, as traffic does not need to traverse DU 1003, CU 1005, and an intervening backhaul network between DU network 1000 and the core network. In some embodiments, MEC 1007 may include, and/or may implement, some or all of the functionality described above with respect to QDS 107, TCS 109, UPF 935, and/or one or more other devices, systems, VNFs, CNFs, etc.

Figure 11:
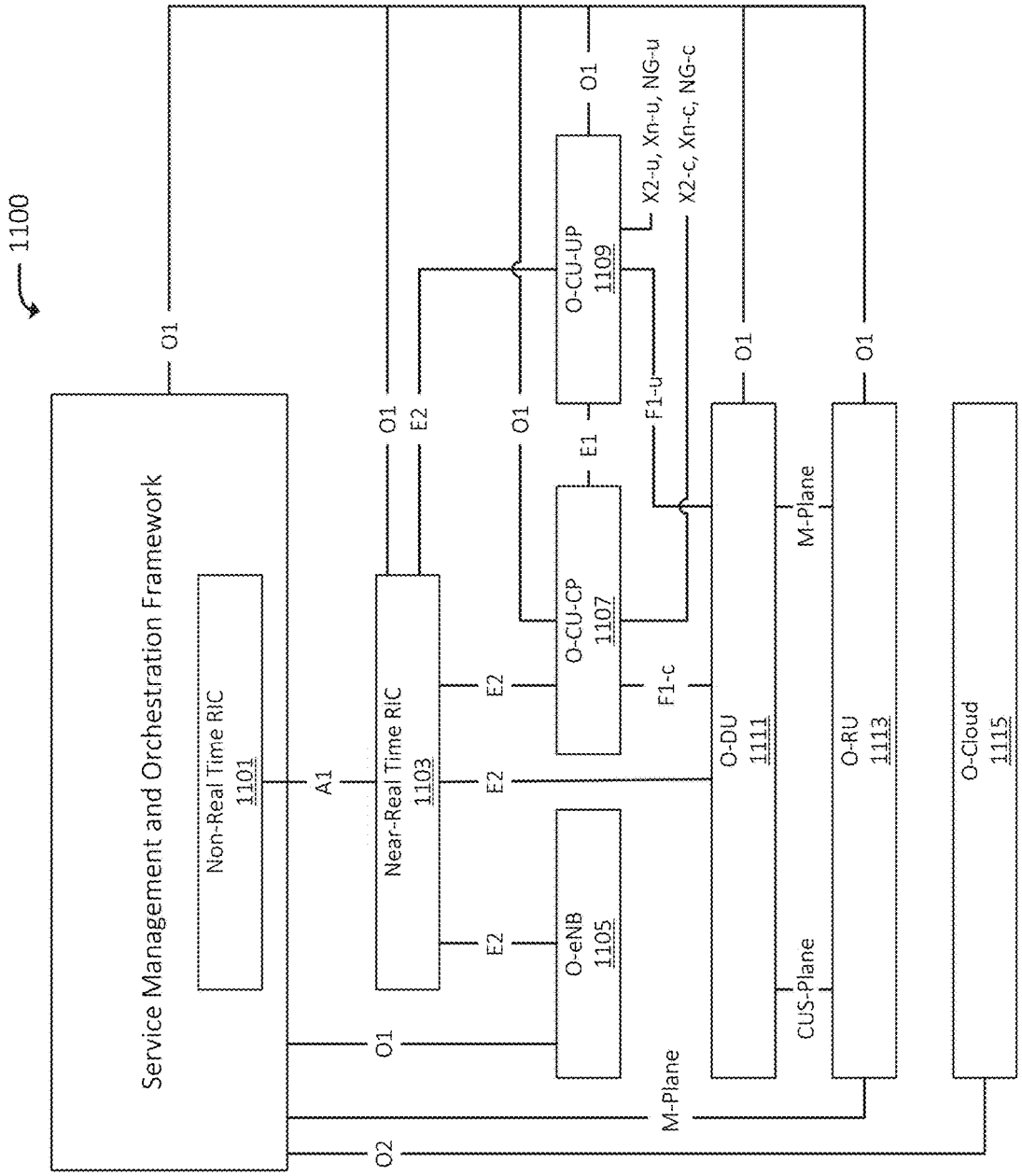
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. In some embodiments, such parameters may include TDD configuration information, as discussed above. For example, in some embodiments, Near-Real Time MC 1103 may perform some or all of the functionality described above with respect to QDS 107 and/or TCS 109.

Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 101 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
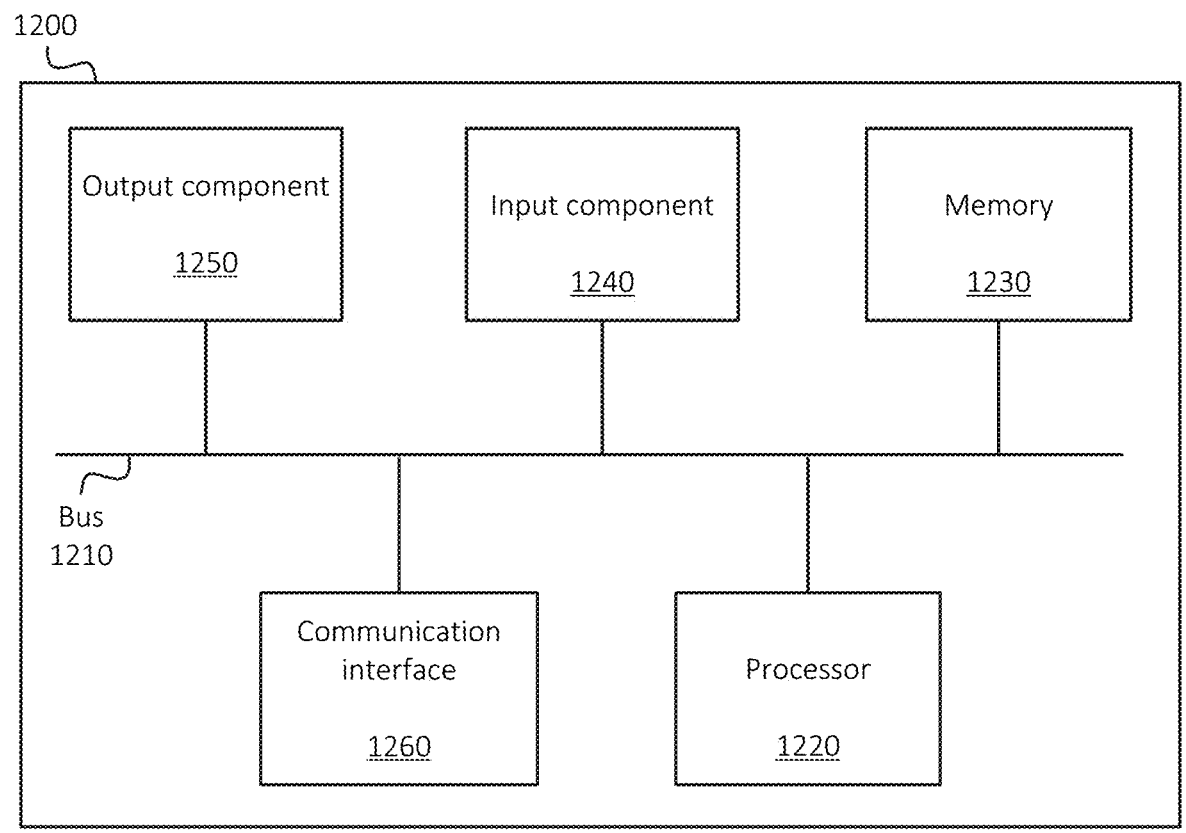
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc.

In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify Quality of Service ("QoS") information associated with a User Equipment ("UE") that is connected to a radio access network ("RAN") of a wireless network;
identify a power class associated with the UE;
determine a time division duplex ("TDD") configuration for the UE based on the identified QoS information and the identified power class associated with the UE; and
implement the determined TDD configuration at the RAN, wherein the UE and the RAN communicate with each other according to the implemented TDD configuration.

2. The device of claim 1, wherein the QoS information includes a Fifth Generation ("5G") QoS identifier ("5QI") value associated with one or more communication sessions between the UE and a core of the wireless network.

3. The device of claim 2, wherein the one or more communication sessions include one or more protocol data unit ("PDU") sessions.

4. The device of claim 2, wherein the 5QI value is received from at least one of:
a Session Management Function ("SMF") of the core of the wireless network, or
an Access and Mobility Management Function ("AMF") of the core of the wireless network.

5. The device of claim 1, wherein the one or more processors are further configured to:

maintain one or more models that correlate particular sets of UE attributes to particular TDD configurations; and select, based on attributes of the UE, a particular model of the one or more models, wherein determining the TDD configuration for the UE is further based on identifying that the TDD configuration is associated with the particular model.

6. The device of claim 5, wherein the attributes of the UE include at least one of:
   a UE device type, or
   the UE power class.

7. The device of claim 1, wherein the TDD configuration is a first TDD configuration and wherein the UE is a first UE, wherein the one or more processors are further configured to:
   implement a second TDD configuration, that is different from the first TDD configuration, with respect to a second UE that is communicatively coupled to the RAN.

8. A non-transitory computer-readable medium, storing a plurality of processor-executable instructions to:
   identify Quality of Service ("QoS") information associated with a User Equipment ("UE") that is connected to a radio access network ("RAN") of a wireless network;
   identify a power class associated with the UE;
   determine a time division duplex ("TDD") configuration for the UE based on the identified QoS information and the identified power class associated with the UE; and
   implement the determined TDD configuration at the RAN, wherein the UE and the RAN communicate with each other according to the implemented TDD configuration.

9. The non-transitory computer-readable medium of claim 8, wherein the QoS information includes a Fifth Generation ("5G") QoS identifier ("5QI") value associated with one or more communication sessions between the UE and a core of the wireless network.

10. The non-transitory computer-readable medium of claim 9, wherein the one or more communication sessions include one or more protocol data unit ("PDU") sessions.

11. The non-transitory computer-readable medium of claim 9, wherein the 5QI value is received from at least one of:
   a Session Management Function ("SMF") of the core of the wireless network, or
   an Access and Mobility Management Function ("AMF") of the core of the wireless network.

12. The non-transitory computer-readable medium of claim 8, wherein the plurality of processor-executable instructions further include processor-executable instructions to:
   maintain one or more models that correlate particular sets of UE attributes to particular TDD configurations; and
   select, based on attributes of the UE, a particular model of the one or more models, wherein determining the TDD configuration for the UE is further based on identifying that the TDD configuration is associated with the particular model.

13. The non-transitory computer-readable medium of claim 12, wherein the attributes of the UE include at least one of:
   a UE device type, or
   the UE power class.

14. The non-transitory computer-readable medium of claim 8, wherein the TDD configuration is a first TDD configuration and wherein the UE is a first UE, wherein the plurality of processor-executable instructions further include processor-executable instructions to:
   implement a second TDD configuration, that is different from the first TDD configuration, with respect to a second UE that is communicatively coupled to the RAN.

15. A method, comprising:
   identifying Quality of Service ("QoS") information associated with a User Equipment ("UE") that is connected to a radio access network ("RAN") of a wireless network;
   identifying a power class associated with the UE;
   determining a time division duplex ("TDD") configuration for the UE based on the identified QoS information and the identified power class associated with the UE; and
   implementing the determined TDD configuration at the RAN, wherein the UE and the RAN communicate with each other according to the implemented TDD configuration.

16. The method of claim 15, wherein the QoS information includes a Fifth Generation ("5G") QoS identifier ("5QI") value associated with one or more communication sessions between the UE and a core of the wireless network.

17. The method of claim 16, wherein the one or more communication sessions include one or more protocol data unit ("PDU") sessions, and wherein the 5QI value is received from at least one of:
   a Session Management Function ("SMF") of the core of the wireless network, or
   an Access and Mobility Management Function ("AMF") of the core of the wireless network.

18. The method of claim 15, further comprising:
   maintaining one or more models that correlate particular sets of UE attributes to particular TDD configurations; and
   selecting, based on attributes of the UE, a particular model of the one or more models, wherein determining the TDD configuration for the UE is further based on identifying that the TDD configuration is associated with the particular model.

19. The method of claim 18, wherein the attributes of the UE include at least one of:
   a UE device type, or
   the UE power class.

20. The method of claim 15, wherein the TDD configuration is a first TDD configuration and wherein the UE is a first UE, the method further comprising:
   implementing a second TDD configuration, that is different from the first TDD configuration, with respect to a second UE that is communicatively coupled to the RAN.

* * * * *